US012573054B2

(12) United States Patent (10) Patent No.: US 12,573,054 B2
Zhu et al. (45) Date of Patent: Mar. 10, 2026

(54) IMAGE ANALYSIS TO IDENTIFY NON-WORKING REGIONS IN AN IMAGE

(71) Applicants:Suzhou Cleva Precision Machinery & Technology Co, Ltd, Suzhou (CN); Skybest Electric Appliance (Suzhou) Co., Ltd., Suzhou (CN)

(72) Inventors: Shaoming Zhu, Suzhou (CN); Xue Ren, Suzhou (CN)

(73) Assignees: Suzhou Cleva Precision Machinery & Technology Co., Ltd., Suzhou (CN); Skybest Electric Appliance (Suzhou) Co., Ltd., Suzhou (CN)

( * ) Notice: Subject to any disclaimer, the term of this patent is extended or adjusted under 35 U.S.C. 154(b) by 315 days.

(21) Appl. No.: 18/354,026

(22) Filed: Jul. 18, 2023

(65) Prior Publication Data

US 2024/0029267 A1 Jan. 25, 2024

(30) Foreign Application Priority Data

Jul. 19, 2022 (CN) .......................... 202210872021.7

(51) Int. Cl.
*G06T 7/00* (2017.01)
*G06T 7/11* (2017.01)
*G06T 7/12* (2017.01)
*G06T 7/13* (2017.01)
*G06T 7/136* (2017.01)
*G06T 7/174* (2017.01)
*G06T 7/40* (2017.01)
*G06T 7/90* (2017.01)

(52) U.S. Cl.
CPC .................. *G06T 7/12* (2017.01); *G06T 7/11* (2017.01); *G06T 7/13* (2017.01); *G06T 7/136* (2017.01); *G06T 7/174* (2017.01); *G06T 7/40* (2013.01); *G06T 7/90* (2017.01); *G06T 2207/10024* (2013.01); *G06T 2207/30242* (2013.01)

(58) Field of Classification Search
CPC ... G06T 2207/10024; G06T 7/13; G06T 7/12; G06T 7/11; G06T 7/136; G06T 7/90; G06T 7/40; G06T 2207/30168; G06V 10/44; G06V 10/56; G06V 20/56; G06V 10/507; G06V 20/188
See application file for complete search history.

(56) References Cited

U.S. PATENT DOCUMENTS

| | | | |
|---|---|---|---|
| 10,930,078 B1* | 2/2021 | Côté | G06T 19/20 |
| 11,464,161 B1* | 10/2022 | Phanco | A01D 75/185 |
| 11,934,196 B1* | 3/2024 | Hoyda | G05D 1/249 |
| 2020/0242748 A1* | 7/2020 | Chen | G06T 3/4038 |

FOREIGN PATENT DOCUMENTS

WO WO-2014173290 A1 * 10/2014 ............. G06V 20/56

* cited by examiner

*Primary Examiner* — Li Liu

(74) *Attorney, Agent, or Firm* — JK Intellectual Property Law, PA

(57) ABSTRACT

An image analysis method includes the steps of obtaining a saturation channel image according to an original image; extracting several contours from the saturation channel image; determining target parameter values corresponding to each contour; and determining according to analysis results of the target parameter values corresponding to each contour whether there is a non-working region in the original image. A related image analysis device, computer device, and computer-readable storage medium are also disclosed.

16 Claims, 8 Drawing Sheets

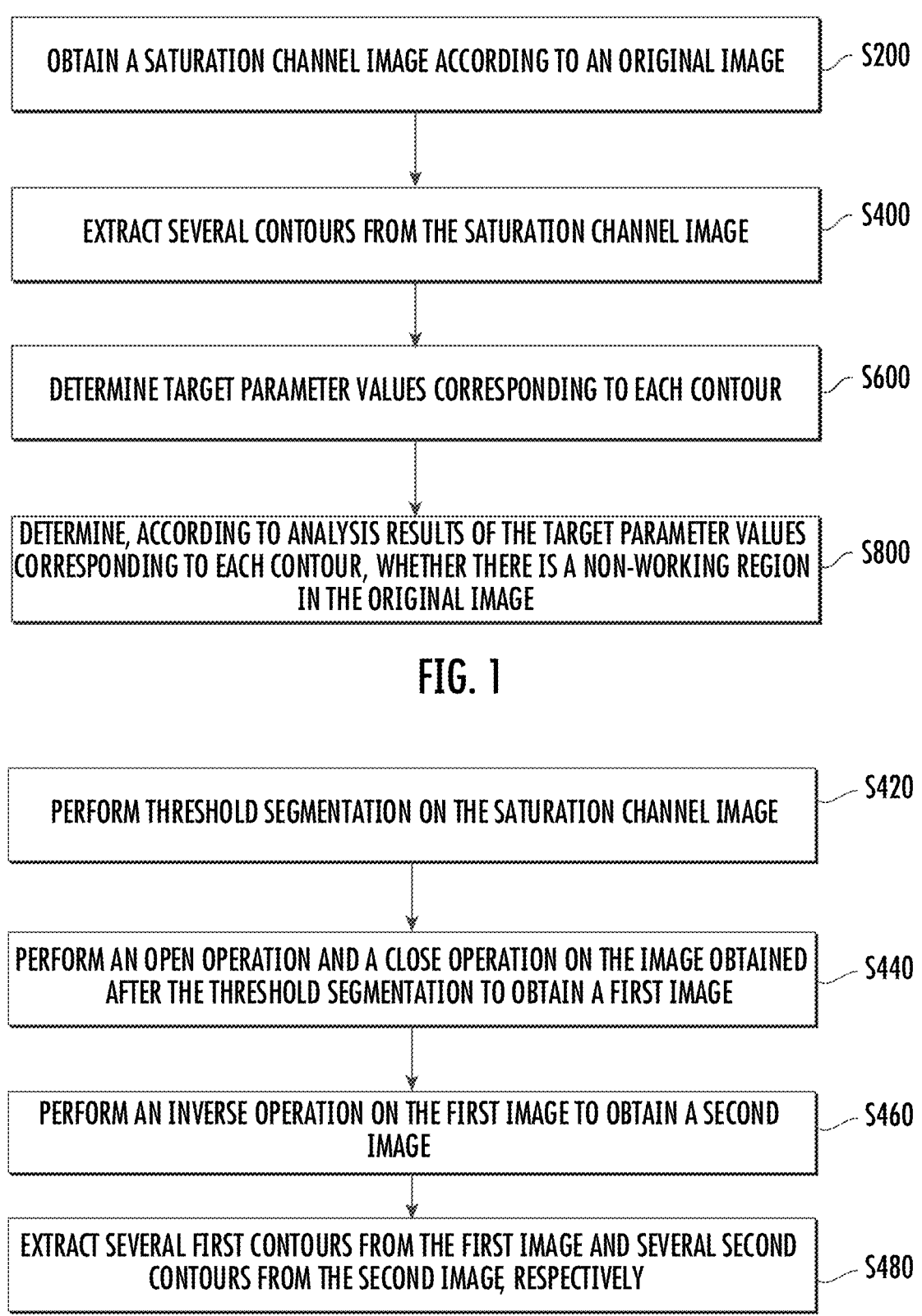

OBTAIN A SATURATION CHANNEL IMAGE ACCORDING TO AN ORIGINAL IMAGE — S200

EXTRACT SEVERAL CONTOURS FROM THE SATURATION CHANNEL IMAGE — S400

DETERMINE TARGET PARAMETER VALUES CORRESPONDING TO EACH CONTOUR — S600

DETERMINE, ACCORDING TO ANALYSIS RESULTS OF THE TARGET PARAMETER VALUES CORRESPONDING TO EACH CONTOUR, WHETHER THERE IS A NON-WORKING REGION IN THE ORIGINAL IMAGE — S800

FIG. 1

PERFORM THRESHOLD SEGMENTATION ON THE SATURATION CHANNEL IMAGE — S420

PERFORM AN OPEN OPERATION AND A CLOSE OPERATION ON THE IMAGE OBTAINED AFTER THE THRESHOLD SEGMENTATION TO OBTAIN A FIRST IMAGE — S440

PERFORM AN INVERSE OPERATION ON THE FIRST IMAGE TO OBTAIN A SECOND IMAGE — S460

EXTRACT SEVERAL FIRST CONTOURS FROM THE FIRST IMAGE AND SEVERAL SECOND CONTOURS FROM THE SECOND IMAGE, RESPECTIVELY — S480

FIG. 2

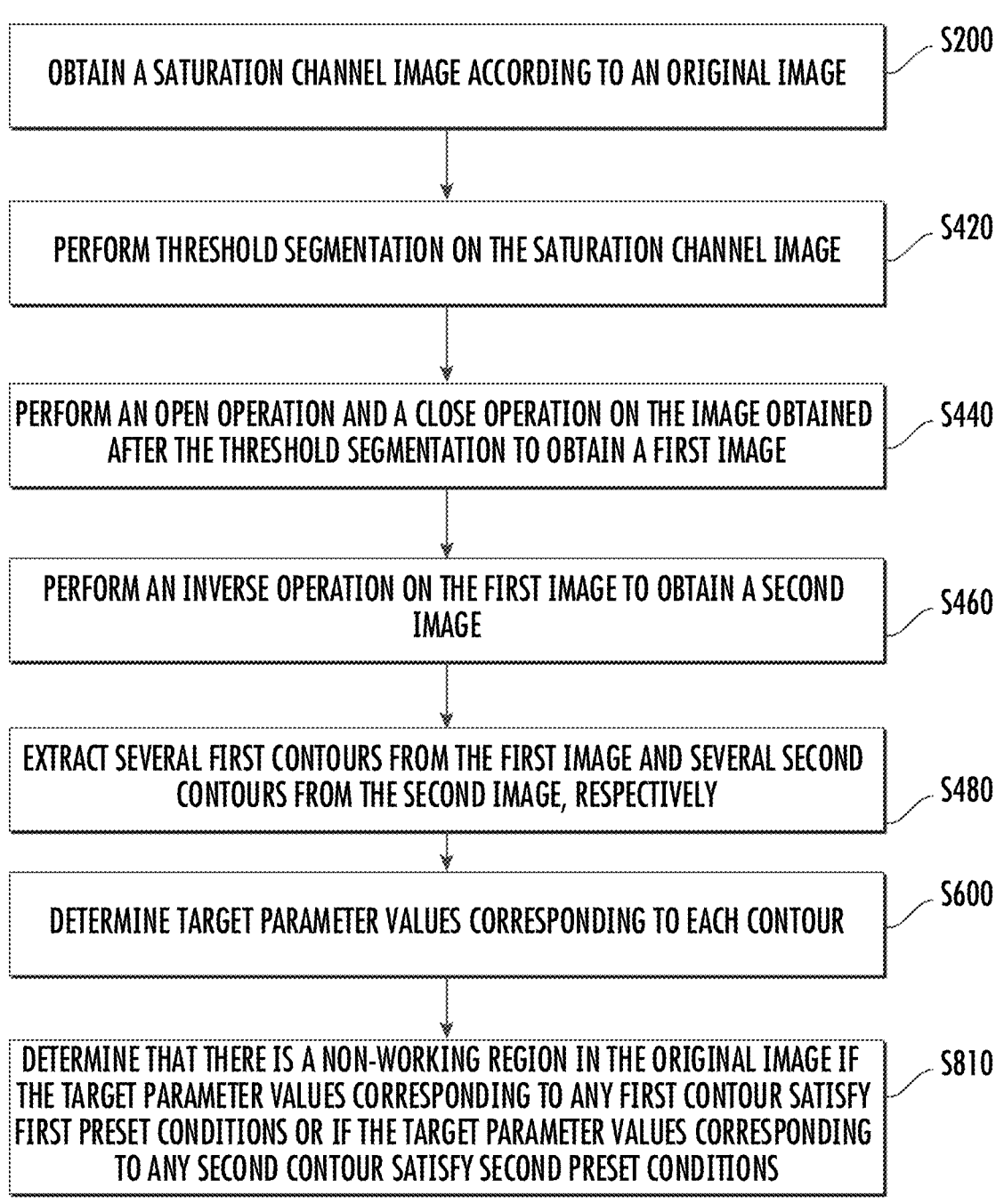

OBTAIN A SATURATION CHANNEL IMAGE ACCORDING TO AN ORIGINAL IMAGE — S200

PERFORM THRESHOLD SEGMENTATION ON THE SATURATION CHANNEL IMAGE — S420

PERFORM AN OPEN OPERATION AND A CLOSE OPERATION ON THE IMAGE OBTAINED AFTER THE THRESHOLD SEGMENTATION TO OBTAIN A FIRST IMAGE — S440

PERFORM AN INVERSE OPERATION ON THE FIRST IMAGE TO OBTAIN A SECOND IMAGE — S460

EXTRACT SEVERAL FIRST CONTOURS FROM THE FIRST IMAGE AND SEVERAL SECOND CONTOURS FROM THE SECOND IMAGE, RESPECTIVELY — S480

DETERMINE TARGET PARAMETER VALUES CORRESPONDING TO EACH CONTOUR — S600

DETERMINE THAT THERE IS A NON-WORKING REGION IN THE ORIGINAL IMAGE IF THE TARGET PARAMETER VALUES CORRESPONDING TO ANY FIRST CONTOUR SATISFY FIRST PRESET CONDITIONS OR IF THE TARGET PARAMETER VALUES CORRESPONDING TO ANY SECOND CONTOUR SATISFY SECOND PRESET CONDITIONS — S810

FIG. 3

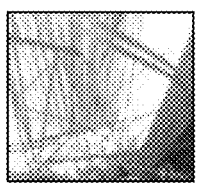
ORGMAT     SMAT     NORMSMAT     OTSUSMAT
FIG. 5A
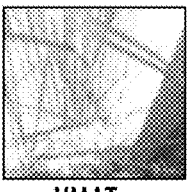 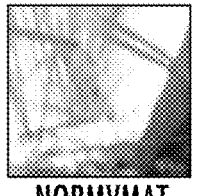 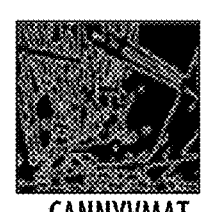 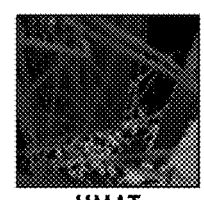 
VMAT     NORMVMAT     CANNYVMAT     HMAT     PREVOBSTACLEMAT
FIG. 5B
3 CONTOURS
UNOBSTSMAT
12 CONTOURS
OBSTSMAT     THE 6TH CONTOUR SATISFIES
DETERMINATION
BOUNDRECT.HEIGHT = 85>70
BOUNDRECT.WIDTH = 160 >85
OVERBRIGHTPIX = 5137>200
LABELSO = 40>10
AVGVIDPXN = 0.296<0.49
AVGCONV = 0.129<0.26
AVGBRIGHT = 5.2<245
FIG. 5C

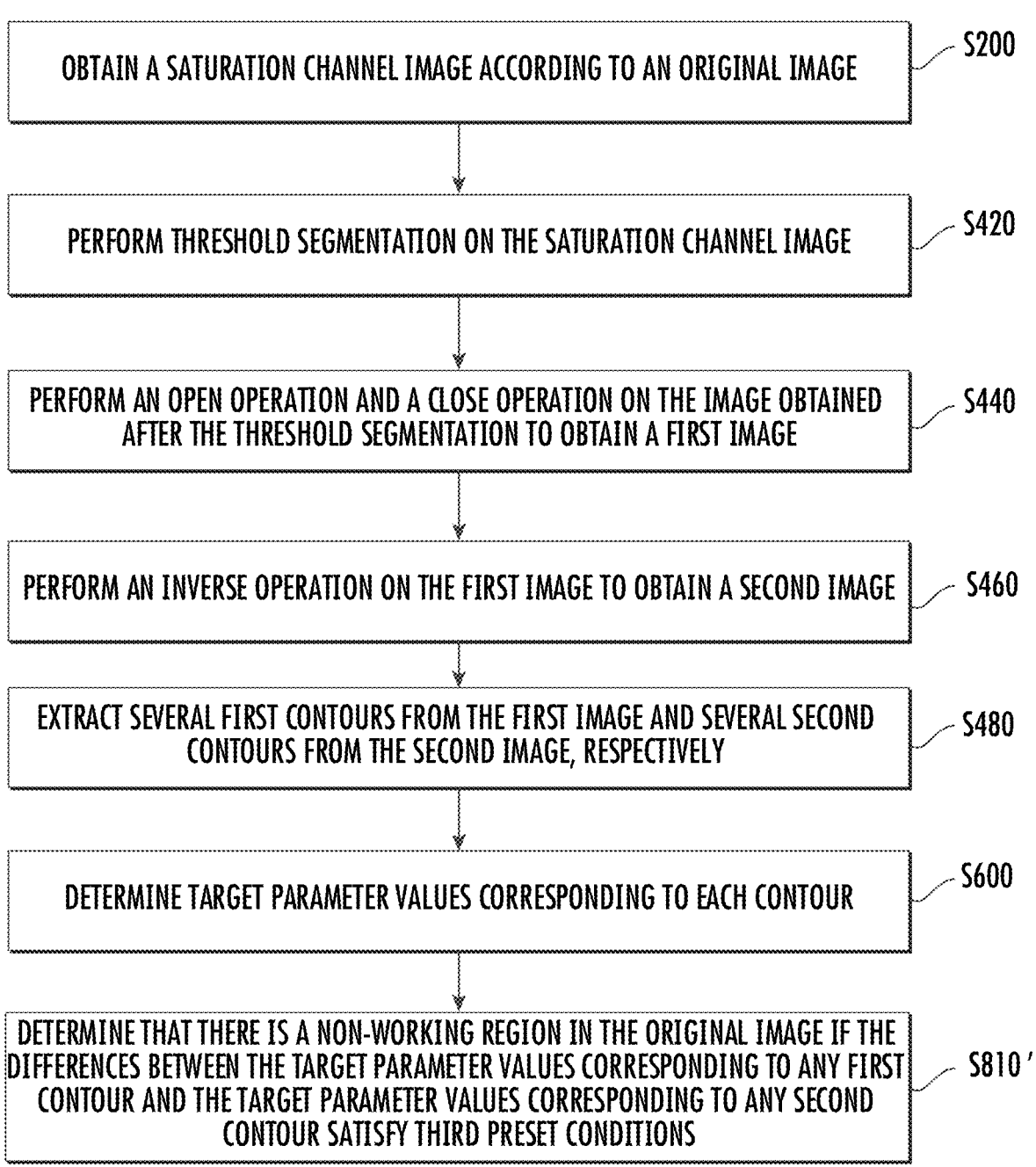

OBTAIN A SATURATION CHANNEL IMAGE ACCORDING TO AN ORIGINAL IMAGE — S200

PERFORM THRESHOLD SEGMENTATION ON THE SATURATION CHANNEL IMAGE — S420

PERFORM AN OPEN OPERATION AND A CLOSE OPERATION ON THE IMAGE OBTAINED AFTER THE THRESHOLD SEGMENTATION TO OBTAIN A FIRST IMAGE — S440

PERFORM AN INVERSE OPERATION ON THE FIRST IMAGE TO OBTAIN A SECOND IMAGE — S460

EXTRACT SEVERAL FIRST CONTOURS FROM THE FIRST IMAGE AND SEVERAL SECOND CONTOURS FROM THE SECOND IMAGE, RESPECTIVELY — S480

DETERMINE TARGET PARAMETER VALUES CORRESPONDING TO EACH CONTOUR — S600

DETERMINE THAT THERE IS A NON-WORKING REGION IN THE ORIGINAL IMAGE IF THE DIFFERENCES BETWEEN THE TARGET PARAMETER VALUES CORRESPONDING TO ANY FIRST CONTOUR AND THE TARGET PARAMETER VALUES CORRESPONDING TO ANY SECOND CONTOUR SATISFY THIRD PRESET CONDITIONS — S810'

IMAGE ANALYSIS TO IDENTIFY NON-WORKING REGIONS IN AN IMAGE

CROSS-REFERENCE TO RELATED PATENT APPLICATIONS

This application claims benefit of Chinese Application No. 202210872021.7, filed on Jul. 19, 2022, which is incorporated by reference herein.

TECHNICAL FIELD

The present application relates to the field of image processing technology, and in particular, to an image analysis method and apparatus, a computer device, and a readable storage medium.

BACKGROUND

With the development of technology, existing intelligent devices already can integrate image analysis technology, which improves the intelligence and convenience of use of the intelligent devices.

An intelligent lawn mower is used as an example. The intelligent lawn mower collects image information of the ground in real time during travel, and then analyzes and processes collected images to recognize lawn regions and non-lawn regions (such as cement land), so as to accurately move to the lawn regions and clean the lawn regions. However, the existing image analysis technology is not yet perfect, and often cannot effectively recognize the non-lawn regions. As a result, the intelligent lawn mower may move to the non-lawn regions, the working efficiency of the intelligent lawn mower is reduced, and even the intelligent lawn mower collides with obstacles and is damaged.

Similarly, other intelligent devices with image collection and analysis functions may also be unable to effectively recognize non-working regions when working.

SUMMARY

Based on this, it is necessary to provide an image analysis method, an image analysis apparatus, a computer device, and a computer-readable storage medium for the above problems.

An image analysis method includes:

obtaining a saturation channel image according to an original image;

extracting several contours from the saturation channel image;

determining target parameter values corresponding to each contour; and determining, according to analysis results of the target parameter values corresponding to each contour, whether there is a non-working region in the original image.

In one embodiment, the target parameter values include any of contour width, contour height, quantity of pixels contained in a contour, proportion of valid pixel values, average saturation, average brightness roughness, average brightness value, average hue value, quantity of over-bright pixels, peak of the quantity of hue pixels, quantity of non-exposed white pixels, and average hue roughness.

In one embodiment, the determining target parameter values corresponding to each contour includes:

converting the original image into an HSV image;

performing color segmentation on the HSV image in combination with a hue channel threshold, a saturation channel threshold, and a value channel threshold to obtain a target image;

obtaining a quantity of green pixels in the target image; and determining a proportion of valid pixel values in combination with the quantity of green pixels in the target image and a quantity of pixels contained in the contour.

In one embodiment, the image analysis method further includes obtaining a value channel image according to the original image; and the determining target parameter values corresponding to each contour includes:

determining the quantity of over-bright pixels according to the value channel image;

pre-processing the value channel image to obtain a pre-processed image, where the pre-processing includes filtering and normalization;

determining a brightness value according to the pre-processed image, and determining the average brightness value based on the brightness value and the quantity of pixels contained in the contour;

performing edge extraction on the pre-processed image to obtain an edge image; and determining a brightness roughness according to the edge image, and determining an average brightness roughness based on the brightness roughness and the quantity of pixels contained in the contour; and/or the image analysis method further includes obtaining a hue channel image according to the original image;

wherein the determining target parameter values corresponding to each contour includes:

determining a hue value according to the hue channel image, and determining the average hue value based on the hue value and the quantity of pixels contained in the contour;

obtaining a histogram corresponding to the hue channel image, and determining a peak of the quantity of hue pixels according to the histogram;

pre-processing the hue channel image, performing edge extraction on the pre-processed image to obtain an edge image, determining a hue roughness according to the edge image, and determining an average hue roughness based on the hue roughness and the quantity of pixels contained in the contour; and determining the quantity of non-exposed white pixels by combining the value channel image and the hue channel image.

In one embodiment, the extracting several contours from the saturation channel image includes:

performing threshold segmentation on the saturation channel image;

performing an open operation and a close operation on an image obtained after the threshold segmentation to obtain a first image;

performing an inverse operation on the first image to obtain a second image; and extracting several first contours from the first image and several second contours from the second image, respectively.

In one embodiment, the determining, according to analysis results of the target parameter values corresponding to each contour, whether there is a non-working region in the original image includes:

determining that there is the non-working region in the original image if the target parameter values corresponding to any first contour satisfy first preset conditions, or if the target parameter values corresponding to any second contour satisfy second preset conditions.

In one embodiment, the first preset conditions include: the proportion of valid pixel values is less than a first preset proportion, the average brightness roughness is less than a first brightness roughness, the average brightness value is greater than a first preset brightness value, the quantity of pixels contained in the contour is within a preset range, the peak of the quantity of hue pixels is greater than a first peak value, and the average hue value is greater than a first preset hue value; and the second preset conditions include: the quantity of over-bright pixels is greater than a first quantity of pixels, the quantity of non-exposed white pixels is greater than a second quantity of pixels, the proportion of valid pixel values is less than a second preset proportion, the average brightness roughness is less than a second brightness roughness, and the average brightness value is less than a second preset brightness value.

In one embodiment, the determining, according to analysis results of the target parameter values corresponding to each contour, whether there is a non-working region in the original image includes:

determining that there is a non-working region in the original image if differences between the target parameter values corresponding to any first contour and the target parameter values corresponding to any second contour satisfy third preset conditions.

In one embodiment, the third preset conditions include:

a difference in average saturation between the first contour and the second contour is greater than a first difference, a ratio of the average hue roughness of the first contour to the average hue roughness of the second contour is less than a preset ratio, the average brightness roughness of the first contour is less than a third brightness roughness, the average brightness roughness of the second contour is less than a fourth brightness roughness, the average brightness value of the first contour is greater than a third preset brightness value, the average brightness value of the second contour is less than a fourth preset brightness value, the proportion of valid pixel values of the second contour is less than a third preset proportion, the peak of the quantity of hue pixels is greater than a second peak, and the quantity of pixels contained in the second contour is greater than a third quantity of pixels;

or, the third preset conditions include:

a difference in average saturation between the first contour and the second contour is greater than a second difference, an absolute value of the difference in average brightness value between the first contour and the second contour is less than a third difference, the average brightness roughness of the second contour is less than a fifth brightness roughness, the proportion of valid pixel values of the second contour is less than a fourth preset proportion, and the quantity of pixels contained in the second contour is greater than a fourth quantity of pixels;

or, the third preset conditions include:

the average hue value of the first contour is less than a second preset hue value, the average hue value of the second contour is greater than a third preset hue value, the proportion of valid pixel values of the second contour is less than a fifth preset proportion, the average brightness roughness of the second contour is greater than a sixth brightness roughness, the average hue roughness of the second contour is greater than a preset hue roughness, the quantity of over-bright pixels is greater than a fifth quantity of pixels, the average brightness value of the second contour is greater than a fifth preset brightness value, and the quantity of pixels contained in the second contour is greater than a sixth quantity of pixels.

An image analysis apparatus includes:

an obtaining module, configured to obtain a saturation channel image according to an original image;

an extraction module, configured to extract several contours from the saturation channel image;

a first determination module, configured to determine target parameter values corresponding to each contour; and a second determination module, configured to determine, according to analysis results of the target parameter values corresponding to each contour, whether there is a non-working region in the original image.

A computer device includes a memory and a processor, the memory storing a computer program, and the processor implementing the foregoing image analysis method when executing the computer program.

A computer-readable storage medium stores a computer program thereon, the foregoing image analysis method being implemented when the computer program is executed by a processor.

According to the foregoing image analysis method and apparatus, computer device, and readable storage medium, a saturation channel image is first obtained according to an original image, then several contours are extracted from the saturation channel image, target parameter values corresponding to each contour is determined, the target parameter values corresponding to each contour is finally analyzed, and whether there is a non-working region in the original image is determined according to analysis results. That is, the saturation channel image may be pre-segmented by using saturation difference characteristics of different types of ground regions, further parameter analysis may be performed on the segmented contours in combination with the characteristics or differences between a working region and a non-working region, and then whether there is a non-working region in each contour may be recognized one by one, thereby effectively reducing omission of non-working regions in the image, recognizing the non-working regions in the image more accurately, and improving the efficiency and safety of an intelligent device.

BRIEF DESCRIPTION OF THE DRAWINGS

FIG. 1 is a flow block diagram of an image analysis method provided in an embodiment of the present application;

FIG. 2 is a flow block diagram of step S400 of the image analysis method provided in an embodiment of the present application;

FIG. 3 is a flow block diagram of an image analysis method provided in another embodiment of the present application;

FIGS. 5A-5C are schematic diagrams of each image obtained in a specific example of the present application;

FIG. 6 is a flow block diagram of an image analysis method provided in still another embodiment of the present application;

Figure 4:
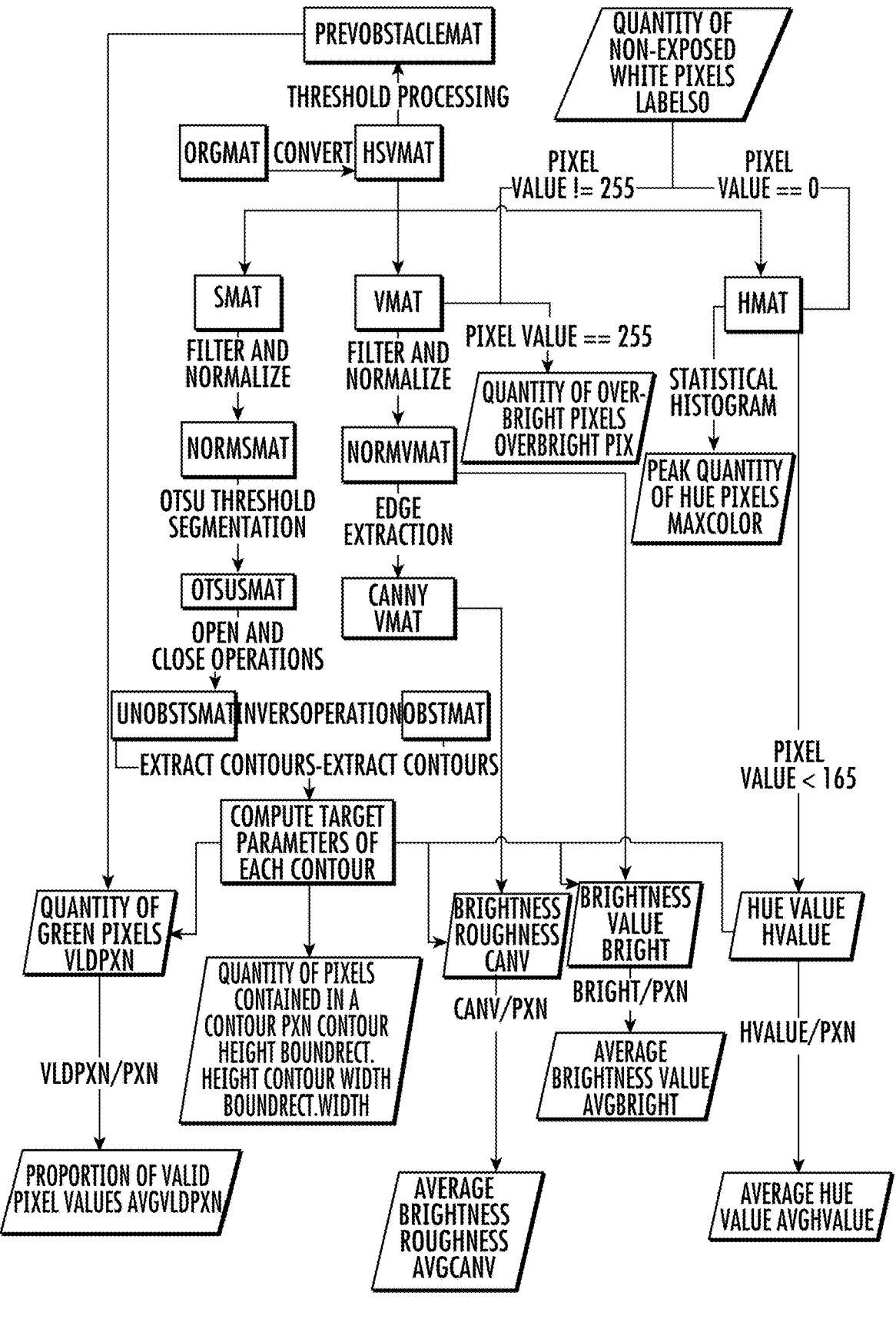
FIG. 4 is a flow block diagram of a specific example of the present application.

DETAILED DESCRIPTION OF THE
EMBODIMENTS

In order to facilitate the understanding of the present application, the present application will be described more comprehensively below with reference to the relevant accompanying drawings. Preferred embodiments of the present application are shown in the drawings. However, the present application may be implemented in many different forms, and is not limited to the embodiments described herein. On the contrary, these embodiments are provided for a more thorough and comprehensive understanding of the disclosure of the present application.

In the present application, unless otherwise specified and limited, the terms "mounted", "connected", "connection", "fixed", and the like should be understood broadly. For example, the "connection" may be a fixed connection, a detachable connection, an integration, a mechanical connection, an electrical connection, a direct connection, an indirect connection through a medium, or an internal communication of two elements, or an interaction between two elements. Those of ordinary skill in the art may understand the specific meanings of the above terms in the present application according to specific circumstances.

The terms "first" and "second" are merely for the sake of description, and cannot be understood as indicating or implying the relative importance or implicitly indicating the quantity of the indicated technical features. Therefore, the features defined by the terms "first" and "second" may explicitly or implicitly include at least one of these features. In the description of the present application, the meaning of "plurality" is at least two, for example two or three, unless otherwise specifically defined.

Unless otherwise defined, all technical and scientific terms used herein have the same meanings as commonly understood by those of ordinary skill in the technical field of the present application. The terms used in the description of the present application are only for the purpose of describing specific embodiments, but are not intended to limit the present application. The term "and/or" used herein includes any and all combinations of one or more relevant listed items.

As mentioned in the background, the image analysis technology, as a key technology, has been widely used in various intelligent devices. An intelligent lawn mower is used as an example. The intelligent lawn mower may collect image information of the ground in real time during travel, and then analyze and process the image information to recognize lawn regions and non-lawn regions (such as cement land or stone floor), so as to move to the lawn regions for cleaning.

However, the existing image analysis technology is not yet perfect and often cannot effectively and accurately recognize the non-lawn regions, that is, mistakenly recognizes non-lawn regions as lawn regions. As a result, the intelligent lawn mower moves to the non-lawn regions for cleaning, which reduces the working efficiency of the intelligent lawn mower. On the other hand, if there are obstacles in the non-lawn regions, the intelligent lawn mower may be damaged due to collision with the obstacles. Similarly, other intelligent devices with image collection and analysis functions may also be unable to effectively recognize non-working regions when working.

Thus, embodiments of the present application provide an image analysis method, an image analysis apparatus, a computer device, and a computer-readable storage medium for effectively recognizing non-working regions in images to improve working efficiency and safety of an intelligent device.

In one embodiment, an image analysis method is provided. The image analysis method may be used for recognizing a non-working region from a captured image. Hereinafter, a lawn mower is used as an example for explanation, that is, the working region is a lawn region, and the non-working region is a non-lawn region.

With reference to FIG. 1, an image analysis method provided in this embodiment includes the following steps:

Step S200: Obtain a saturation channel image according to an original image.

Images are captured through a capture device. When an image is captured, the captured device is obtained from the capture device. In this embodiment of the present application, the image is defined as the original image, and the original image may include a lawn region and a non-lawn region. The image has multiple characteristics, such as saturation, hue, and value, each of which has a corresponding channel image. In this embodiment, the original image may be processed correspondingly to obtain the saturation channel image for subsequent processing.

Step S400: Extract several contours from the saturation channel image.

After the saturation channel image is obtained, in order to more accurately recognize whether there is a non-lawn region in the image, the saturation channel image may be further processed. That is, combined with saturation difference characteristics of different types of ground regions, the saturation channel image is pre-segmented to extract the several contours for subsequent screening analysis on whether there is a non-lawn region in each contour.

Step S600: Determine target parameter values corresponding to each contour.

After the contours are extracted, the target parameter values of each contour may be determined one by one. The target parameter values may be parameter values of features that reflect whether there is a non-lawn region in the contour, for example, a proportion of green pixels and a brightness related value. Target parameters may be determined according to actual needs, and values of the target parameters may be obtained. The target parameters selected in this embodiment may be referred to subsequent specific descriptions. In this embodiment, the target parameter values corresponding to each contour may be determined by combining a value channel image and a hue channel image, that is, the target parameter values of each contour are determined by combining features of saturation, value, and hue, so that subsequent determination of a non-lawn region by combining the target parameter values is more accurate.

Step S800: Determine, according to analysis results of the target parameter values corresponding to each contour, whether there is a non-working region in the original image.

After the target parameter values of each contour are determined, the target parameter values of each contour may be analyzed, and then whether there is a non-working region in the image may be determined according to the analysis results. The target parameter values of each contour may be analyzed by many methods. For example, the target parameter values of the contour itself may be analyzed separately to determine whether the target parameter values of the single contour conform to characteristics of a non-lawn region. Alternatively, the difference between the target parameter values of any two contours may be analyzed according to difference characteristics between a non-lawn region and a lawn region, and then whether the difference between the target parameter values of the contours conforms to difference characteristics between the non-lawn region and the lawn region is determined. Of course, other analysis methods may also be used for the target parameter values of each contour. These analysis methods all belong to the concept of the present application as long as they can finally determine whether there is a non-lawn region in the image.

In practical applications, there may be a non-lawn region in each extracted contour. Therefore, as long as there is a non-lawn region in any contour, it may be considered that there is a non-lawn region in the image, and the position of the non-lawn region in the image may be determined, so that the lawn mower avoids the non-lawn region during travel.

According to the foregoing image analysis method, a saturation channel image is first obtained according to an original image, then several contours are extracted from the saturation channel image, target parameter values corresponding to each contour is determined, the target parameter values corresponding to each contour is finally analyzed, and whether there is a non-working region in the original image is determined according to analysis results. That is, the saturation channel image may be pre-segmented by using saturation difference characteristics of different types of ground regions, further parameter analysis may be performed on the segmented contours in combination with the characteristics or differences between a working region and a non-working region, and then whether there is a non-working region in each contour may be recognized one by one, thereby effectively reducing omission of non-working regions in the image, recognizing the non-working regions in the image more accurately, and improving the efficiency and safety of an intelligent device.

In this embodiment, the original image captured by a capture device such as a camera is usually in an RGB format. In step S200, the image in the RGB format may be first converted into an image in an HSV format (referred to as an HSV image), and then the HSV image is segmented to obtain the saturation channel image.

The HSV format is a color space, including a hue H, a saturation S, and a value V. The hue H is measured by an angle, with a value range of 0°-180°; the saturation S represents a degree to which the color is close to a spectral color, a larger proportion of the spectral color indicates a higher degree to which the color is close to the spectral color and a higher saturation of the color, and a value range of the saturation S is 0%-100%; and the value V represents a degree of brightness of the color, the value V is related to the transmittance or reflectance of an object for an object color, and a value range of the value V is 0%-100%, where 0% represents black and 100% represents white. In this embodiment, after the HSV image is segmented, a saturation channel image, a value channel image, and a hue channel image may be obtained simultaneously. In the current step, only the saturation channel image is required.

With reference to FIG. 2, in one embodiment, step S400, namely, extracting several contours from the saturation channel image, includes:

Step S420: Perform threshold segmentation on the saturation channel image.

In this embodiment, a foreground and a background of the saturation channel image are segmented. Specifically, an Otsu threshold method or other algorithms that may implement the same function may be used for the threshold segmentation.

Before the saturation channel image is segmented, the saturation channel image may be pre-processed, where the pre-processing includes filtering and normalization.

Step S440: Perform an open operation and a close operation on an image obtained after the threshold segmentation to obtain a first image.

The open operation generally refers to smoothing the contour of an object, breaking narrow necks, and eliminating small protrusions. The close operation generally also refers to smoothing the contour of the object, closing narrow gaps and elongated grooves, eliminating small spaces, and filling fractures in contour lines. In this embodiment, the open operation and the close operation performed on the image obtained after the threshold segmentation may smooth the contours in the image, break narrow necks, eliminate small protrusions, close narrow gaps and elongated grooves, eliminate small spaces, and fill fractures in the contour lines to obtain a smoother first image, which facilitates subsequent contour extraction.

Step S460: Perform an inverse operation on the first image to obtain a second image.

After the first image is obtained, the inverse operation may be performed on the first image, that is, pixels in the image are turned into inverse colors, and the inverted image is used as the second image for subsequent contour extraction from the second image.

Step S480: Extract several first contours from the first image and several second contours from the second image, respectively.

When the first image and the second image are obtained, contour detection may be performed on the first image and the second image respectively, then several first contours may be extracted from the first image, and several second contours may be extracted from the second image.

The contours of the first image and the contours of the second image are simultaneously analyzed to further improve the comprehensiveness of subsequent recognition and reduce missed recognition of non-lawn regions.

In one embodiment, the target parameter values include any of contour width, contour height, quantity of pixels contained in a contour, proportion of valid pixel values, average saturation, average brightness roughness, average brightness value, average hue value, quantity of over-bright pixels, peak of the quantity of hue pixels, quantity of non-exposed white pixels, and average hue roughness.

In practical applications, any of the foregoing target parameters may be selected as determination parameters based on actual needs, and the target parameters used for different analysis methods may also differ.

In one embodiment, step S600, namely, the determining target parameter values corresponding to each contour, includes:

Step S610a: Convert the original image into an HSV image.

Step S620a: Perform color segmentation on the HSV image in combination with a hue channel threshold, a saturation channel threshold, and a value channel threshold to obtain a target image.

Step S630a: Obtain a quantity of green pixels in the target image.

Step S640a: Determine a proportion of valid pixel values in combination with the quantity of green pixels in the target image and a quantity of pixels contained in the contour.

The foregoing process is a specific process of determining the proportion of valid pixel values. After the target image is obtained, the quantity of green pixels therein may be obtained. In this embodiment, the green pixels are valid pixels, and the proportion of valid pixel values in each image contour may be determined in combination with the quantity of green pixels and the quantity of pixels contained in each image contour. Generally, the non-lawn region has a relatively low proportion of valid pixel values. Therefore, the proportion of valid pixel values may be used as an important factor to determine whether there is a non-lawn region.

In one embodiment, the image analysis method provided in this embodiment further includes obtaining a value channel image according to the original image, where the value channel image and the saturation channel image may be obtained synchronously.

Step S600, namely, the determining target parameter values corresponding to each contour, includes:

Step S610b: Determine the quantity of over-bright pixels according to the value channel image.

The value channel image is a gray image with a pixel value range of 0-255. In this embodiment, 255 pixels may be defined as over-bright, that is, a quantity of pixels with a value equal to 255 may be determined as the quantity of over-bright pixels.

Step S620b: Pre-process the value channel image, where the pre-processing includes filtering and normalization. This may reduce interference signals in the value channel image, so as to improve the accuracy of subsequent analysis processes.

Step S630b: Determine a brightness value according to the pre-processed image, and determine the average brightness value based on the brightness value and the quantity of pixels contained in the contour.

The pre-processed image is a gray image with a pixel value range of 0-255. In this embodiment, an accumulated value of pixel values of pixels in the image is used as the brightness value, and the brightness value is divided by the quantity of pixels contained in each contour to obtain the average brightness value of each contour.

Step S640b: Perform edge extraction on the pre-processed image to obtain an edge image.

The edge extraction may be further performed on the pre-processed image by using a canny edge detection operator and the like.

Step S650b: Determine a brightness roughness according to the edge image, and determine an average brightness roughness based on the brightness roughness and the quantity of pixels contained in the contour.

The edge image is a binary image, with a pixel value not 0 but 255. The brightness roughness is an accumulated number of edge pixels, and the average brightness roughness of each contour may be a result of the brightness roughness divided by the quantity of pixels contained in each contour.

In summary, relevant target parameter values such as quantity of over-bright pixels, average brightness roughness, and average brightness value of each contour may be determined by combining the features of the value channel image and the features of each contour.

In one embodiment, the image analysis method provided in this embodiment further includes obtaining a hue channel image according to the original image, where the hue channel image and the saturation channel image may be obtained synchronously.

Step S600, namely, the determining target parameter values corresponding to each contour, includes:

Step S610c: Determine a hue value according to the hue channel image, and determine the average hue value based on the hue value and the quantity of pixels contained in the contour.

The hue channel image is a gray image with a pixel value range of 0-180. In this embodiment, pixel values less than 165 may be filtered out, and an accumulated result of all pixel values less than 165 may be used as the hue value. A computational result of dividing the hue value by the quantity of pixels contained in each contour may be used as the average hue value of each contour.

Step S620c: Obtain a histogram corresponding to the hue channel image, and determine a peak of the quantity of hue pixels according to the histogram.

After the hue channel image is obtained, statistics on the corresponding histogram, namely, a hue histogram, may be collected. The horizontal axis of the hue histogram represents a hue distribution range, and the vertical axis represents a quantity of pixels contained in each hue, namely, a quantity of pixels. A maximum quantity of pixels, namely, the peak of the quantity of hue pixels, may be determined through the hue histogram.

Step S630c: Pre-process the hue channel image, perform edge extraction on the pre-processed image to obtain an edge image, determine a hue roughness according to the edge image, and determine an average hue roughness based on the hue roughness and the quantity of pixels contained in the contour.

The pre-processing includes filtering and normalization. The edge extraction may use a canny edge detection operator. The edge image is a binary image, with a pixel value not 0 but 255. The hue roughness is an accumulated number of edge pixels, and the average hue roughness of each contour may be a result of the hue roughness divided by the quantity of pixels contained in each contour.

Step S640c: Determine the quantity of non-exposed white pixels by combining the value channel image and the hue channel image.

Both the value channel image and the hue channel image are gray images, with a pixel value range of 0-255. Statistics on an accumulated number of pixels with values not equal to 255 in the value channel image and values equal to 0 in the hue channel image may be collected as the quantity of non-exposed white pixels.

In addition, a saturation may be further determined according to the pre-processed saturation channel image, and an average saturation of each contour may be determined by combining the saturation and the quantity of pixels contained in each contour. Specifically, a result of dividing the saturation by the quantity of pixels contained in each contour may be used as the average saturation of each contour.

In summary, relevant target parameter values of each contour may be determined by combining the features of the hue channel image, the value channel image, the saturation channel image, and each contour.

With reference to FIG. 3, in one embodiment, step S800, namely, the determining, according to analysis results of the target parameter values corresponding to each contour, whether there is a non-working region in the original image includes:

Step S810: Determine that there is the non-working region in the original image if the target parameter values corresponding to any first contour satisfy first preset conditions, or if the target parameter values corresponding to any second contour satisfy second preset conditions.

The first contour is obtained from the first image, the second contour is obtained from the second image, and the second image is obtained by inverting the first image, so the image features of the first contour and the second contour are different. Based on this, in this embodiment, the first preset conditions are set for the first contour, and the second preset conditions are set for the second contour. The first preset conditions represent determination conditions that there is a non-lawn region in the first contour, and the second preset conditions represent determination conditions that there is a non-lawn region in the second contour. If the target parameter values corresponding to the first contour satisfy the first preset conditions, it indicates that there is a non-lawn region in the current first contour. If the target parameter values corresponding to the second contour satisfy the second preset conditions, it indicates that there is a non-lawn region in the current second contour. Regardless of which contour the non-lawn region is recognized from, it may be determined that there is a non-lawn region in the image.

In one embodiment, the first preset conditions include: the proportion of valid pixel values is less than a first preset proportion, the average brightness roughness is less than a first brightness roughness, the average brightness value is greater than a first preset brightness value, the quantity of pixels contained in the contour is within a preset range, the peak of the quantity of hue pixels is greater than a first peak value, and the average hue value is greater than a first preset hue value;

The second preset conditions include: the quantity of over-bright pixels is greater than a first quantity of pixels, the quantity of non-exposed white pixels is greater than a second quantity of pixels, the proportion of valid pixel values is less than a second preset proportion, the average brightness roughness is less than a second brightness roughness, and the average brightness value is less than a second preset brightness value.

Mass captured images are used as the basis of data analysis, and image features of each contour in the presence of a non-lawn region, such as low proportion of valid pixel values and low average brightness roughness, may be obtained. On this basis, the forgoing characteristics (namely, preset conditions) for the two types of contours may be summarized. If any contour satisfies corresponding characteristics, it may be considered that there is a non-lawn region in the original image. The preset conditions are set accurately, which is beneficial for the intelligent lawn mower to effectively recognize and avoid non-lawn regions.

In one embodiment, in the first preset conditions, the first preset proportion includes 0.7, the first preset roughness includes 0.24, the first preset brightness value includes 60, the preset range includes 1100-13000, the first peak value includes 800, and the first preset hue value includes 60;

In the second preset conditions, the first quantity of pixels includes 200, the second quantity of pixels includes 10, the second preset proportion includes 0.49, the second brightness roughness includes 0.26, and the second preset brightness value includes 245.

That is, in a specific example, the first preset conditions are: the proportion of valid pixel values is less than 0.7, the average brightness roughness is less than 0.24, the average brightness value is greater than 60, the quantity of pixels contained in the contour is within 1100-13000, the peak of the quantity of hue pixels is greater than 800, and the average hue value is greater than 60;

The second preset conditions are: the quantity of over-bright pixels is greater than 200, the quantity of non-exposed white pixels is greater than 10, the proportion of valid pixel values is less than 0.49, the average brightness roughness is less than 0.26, and the average brightness value is less than 245.

Of course, the foregoing thresholds are not unique and may be determined based on actual situations, as long as the preset conditions conform to the characteristics reflected in the contour of the non-lawn region.

Further, it should be noted that both the first preset conditions and the second preset conditions further jointly include limitations on a contour width or a contour height. Before whether the target parameters satisfy the conditions is determined, whether the contour width or the contour height reaches a standard is first determined, and if so, other target parameters may be analyzed, otherwise, subsequent analysis may not be performed on the image contour. For example, if the contour width is greater than 85 or the contour height is greater than 70, it is considered that the contour is valid and subsequent analysis may be performed. If the contour width does not reach 85 and the contour height also does not reach 70, it is considered that the contour is invalid and ignored.

The image analysis method provided in this embodiment will be explained with a specific example with reference to FIG. 4 and FIGS. 5A to 5C:

First, an original image orgMat is obtained and converted into an HSV image hsvMat, which is then segmented into a saturation channel image sMat, a hue channel image hMat, and a value channel image vMat (see FIGS. 5A and 5B).

Color segmentation is performed on the HSV image through a hue channel threshold, a value channel threshold, and a saturation channel threshold to obtain a target image prevObstacleMat (see FIG. 5B).

With reference to FIGS. 5A and 5C, the saturation channel image sMat is filtered and normalized to obtain an image normSMat, the image normSMat is segmented by an Otsu threshold method to obtain an image otsuSMat, an open operation and a close operation are performed on the image otsuSMat to obtain an image unObstSMat, an inverse operation is performed on the image unObstSMat to obtain an image obstSMat, contour detection is performed on the image unObstSMat and the image obstSMat to extract a first contour and a second contour separately, and statistics on the width boundRect.width, height boundRect.height, and quantity of pixels pxN of each image contour are collected.

Statistics on a quantity of pixels with pixel values equal to 255 in the lightness channel image vMat, namely, a quantity of over-bright pixels, are collected.

With reference to FIG. 5B, the value channel image vMat is filtered and normalized to obtain an image normVMat, and a brightness value bright is obtained according to the image normVMat and divided by the quantity of pixels pxN of each contour to compute an average brightness value avgBright of each contour.

With reference to FIG. 5B, edge extraction is performed on the image normVMat by using a canny operator to obtain an edge image cannyVMat, and a brightness roughness canV is obtained according to the edge image cannyVMat and divided by the quantity of pixels pxN of each contour to compute an average brightness roughness avgCanV of each contour.

A corresponding histogram is obtained according to the hue channel image, a peak of the quantity of hue pixels maxColor is determined, and pixel values less than 165 are accumulated to obtain a hue value hValue, which is then divided by the quantity of pixels pxN of each contour to compute an average hue value avgHValue of each contour.

Numbers of pixels with values not equal to 255 in the value channel image and values equal to 0 in the hue channel image are accumulated to obtain a quantity of non-exposed white pixels labels0.

A quantity of green pixels vldpxN is determined according to the target image prevObstacleMat, and then divided by the quantity of pixels pxN of each contour to compute a proportion of valid pixel values avgVldpxN of each contour.

In this example, for a first contour extracted from the image unobstSMat, first preset conditions are: the proportion of valid pixel values avgVldpxN<0.7, the average brightness roughness avgCanV<0.24, the average brightness value avgBright>60, 1100<quantity of pixels boundRect. pxN<13000, the peak of the quantity of hue pixels maxColor>800, and the average hue value avgHValue>60.

For a second contour extracted from the image obstSMat, second preset conditions are: the quantity of over-bright pixels overbrightPix>200, the quantity of non-exposed white pixels labels0>10, the proportion of valid pixel values avgVldpxN<0.49, the average brightness roughness avgCanV<0.26, and the average brightness value avgBright<245.

Meanwhile, the first contour and the second contour also need to satisfy contour width boundRect. width>85 or contour height boundRect. height>70.

With reference to FIG. 5C, the analysis results show 3 first contours and 12 second contours, where the $6^{th}$ second contour satisfies the second preset conditions, and the target parameter values corresponding to the $6^{th}$ second contour are:

the contour height boundRect. height=85>70; the contour width boundRect. width=160>85; the quantity of over-bright pixels=5137>200; and the quantity of non-exposed white pixels labels0=40>10, the proportion of valid pixel values avgVldpxN=0.296<0.49, the average brightness roughness avgCanV=0.129<0.26, and the average brightness value avgBright=206.2<245.

Further, it may be considered that there is a non-lawn region in the $6^{th}$ second contour, and there is a non-lawn region in the currently obtained original image.

With reference to FIG. 6, in one embodiment, step S800, namely, the determining, according to analysis results of the target parameter values corresponding to each contour, whether there is a non-working region in the original image includes:

Step S810': Determine that there is a non-working region in the original image if differences between the target parameter values corresponding to any first contour and the target parameter values corresponding to any second contour satisfy third preset conditions.

Because each contour is segmented based on saturation differences, if there is a non-lawn region in the image, each contour has actually preliminarily distinguished the lawn from the non-lawn region. On this basis, non-lawn regions are recognized again in combination with the differences between the contours. If there is a non-lawn region, differences between the target parameter values of the contour where the non-lawn region is located and the target parameter values of other contours that include only lawn regions theoretically conform to certain laws. In this embodiment, preset conditions may be set in advance in combination with the difference laws. When the target parameter values of the contours are compared, if differences between the target parameter values corresponding to two different contours satisfy the preset conditions, it may be determined that there is a non-lawn region in one of the contours.

In practical applications, every two contours may be compared. When differences between the target parameter values corresponding to two contours are compared, if the differences satisfy the preset conditions, it may be determined that one of the current two contours contains a non-lawn region, and an approximate position of the non-lawn region in the original image may be determined, which is conducive to controlling the lawn mower to avoid working in the non-lawn region.

Mass captured images are used as the basis of data analysis, and image features of contours in the presence and absence of non-lawn regions and the differences between the two may be obtained. In this embodiment, preset conditions may be determined in advance according to the image features and differences obtained above, so as to serve as references for the presence of non-lawn regions in practical application scenarios.

In one embodiment, the third preset conditions include:

a difference in average saturation between the first contour and the second contour is greater than a first difference, a ratio of the average hue roughness of the first contour to the average hue roughness of the second contour is less than a preset ratio, the average brightness roughness of the first contour is less than a third brightness roughness, the average brightness roughness of the second contour is less than a fourth brightness roughness, the average brightness value of the first contour is greater than a third preset brightness value, the average brightness value of the second contour is less than a fourth preset brightness value, the proportion of valid pixel values of the second contour is less than a third preset proportion, the peak of the quantity of hue pixels is greater than a second peak value, and the quantity of pixels contained in the second contour is greater than a third quantity of pixels.

The first difference may include 60, the preset ratio may include 0.32, the third brightness roughness may include 0.2, the fourth brightness roughness may include 0.24, the third preset brightness value may include 40, the fourth preset brightness value may include 245, the third preset proportion may include 0.8, the second peak value may include 830, and the third quantity of pixels may include 2500.

In an alternative embodiment, the third preset conditions include:

a difference in average saturation between the first contour and the second contour is greater than a second difference, an absolute value of the difference in average brightness value between the first contour and the second contour is less than a third difference, the average brightness roughness of the second contour is less than a fifth brightness roughness, the proportion of valid pixel values of the second contour is less than a fourth preset proportion, and the quantity of pixels contained in the second contour is greater than a fourth quantity of pixels.

The second difference may include 90, the third difference may include 30, the fifth brightness roughness may include 0.27, the fourth preset proportion may include 0.78, and the fourth quantity of pixels may include 2500.

In another alternative embodiment, the third preset conditions include:

the average hue value of the first contour is less than a second preset hue value, the average hue value of the second contour is greater than a third preset hue value, the proportion of valid pixel values of the second contour is less than a fifth preset proportion, the average brightness roughness of the second contour is greater than a sixth brightness roughness, the average hue roughness of the second contour is greater than a preset hue roughness, the quantity of over-bright pixels is greater than a fifth quantity of pixels, the average brightness value of the second contour is greater than a fifth preset brightness value, and the quantity of pixels contained in the second contour is greater than a sixth quantity of pixels.

The second preset hue value may include 80, the third preset hue value may include 52, the fifth preset proportion may include 0.38, the sixth brightness roughness may include 0.265, the preset hue roughness may include 0.2, the fifth quantity of pixels may include 190, the fifth preset brightness value may include 110, and the sixth quantity of pixels may include 3000.

The above lists three groups of third preset conditions. In actual comparison, as long as any group of the above preset conditions are satisfied, it may be considered that there is a non-lawn region.

Of course, the foregoing thresholds are not unique and may be determined based on actual situations, as long as the preset conditions are conducive to the recognition of non-lawn regions.

Figure 7:
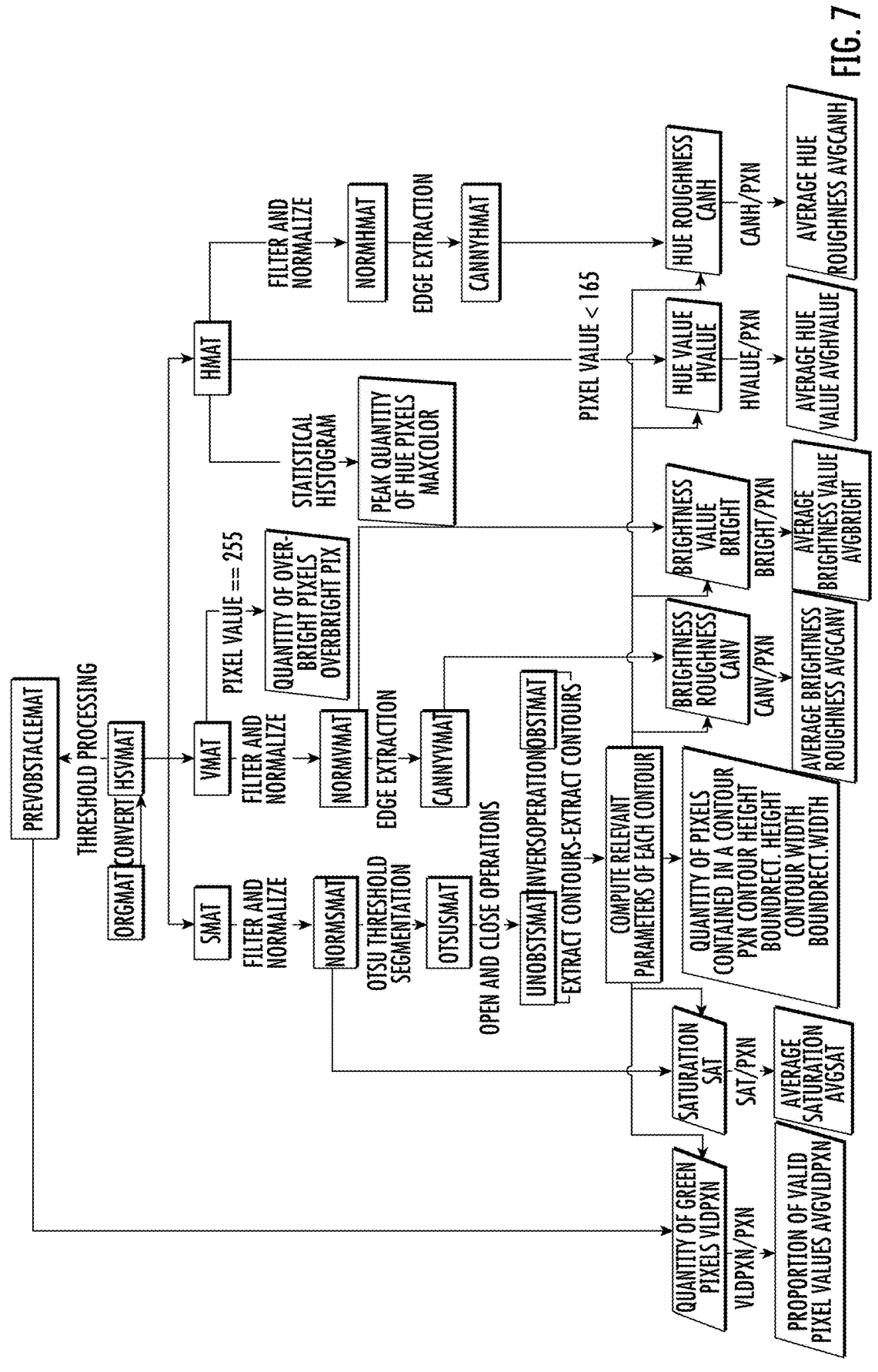
FIG. 7 is a flow block diagram of another specific example of the present application.

The image analysis method provided in this embodiment will be explained with a specific example with reference to FIG. 7 and FIG. 8:

First, an original image orgMat is obtained and converted into an HSV image hsvMat, which is then segmented into a saturation channel image sMat, a hue channel image hMat, and a value channel image vMat.

Color segmentation is performed on the HSV image through a hue channel threshold, a value channel threshold, and a saturation channel threshold to obtain a target image prevObstacleMat.

The saturation channel image sMat is filtered and normalized to obtain an image normSMat, the image norm SMat is segmented by an Otsu threshold method to obtain an image otsuSMat, an open operation and a close operation are performed on the image otsuSMat to obtain an image unObstSMat, an inverse operation is performed on the image unObstSMat to obtain an image obstSMat, contour detection is performed on the image unObstSMat and the image obstSMat to extract a first contour and a second contour separately, and statistics on the width boundRect.width, height boundRect.height, and quantity of pixels pxN of each image contour are collected.

Statistics on a quantity of pixels with pixel values equal to 255 in the lightness channel image vMat, namely, a quantity of over-bright pixels, are collected.

The value channel image vMat is filtered and normalized to obtain an image normVMat, and a brightness value bright is obtained according to the image normVMat and divided by the quantity of pixels pxN of each contour to compute an average brightness value avgBright of each contour.

Edge extraction is performed on the image normVMat by using a canny operator to obtain an edge image cannyVMat, and a brightness roughness canV is obtained according to the edge image cannyVMat and divided by the quantity of pixels pxN of each contour to compute an average brightness roughness avgCanV of each contour.

A corresponding histogram is obtained according to the hue channel image, a peak of the quantity of hue pixels maxColor is determined, and pixel values less than 165 are accumulated to obtain a hue value hValue, which is then divided by the quantity of pixels pxN of each contour to compute an average hue value avgHValue of each contour.

The hue channel image is filtered and normalized to obtain an image norm HMat, edge extraction is performed on the image norm HMat by using a canny operator to obtain an edge image cannyHMat, and a hue roughness canH is obtained according to the edge image cannyHMat and divided by the quantity of pixels pxN of each contour to compute an average hue roughness avgCanH of each contour.

A quantity of green pixels vldpxN is determined according to the target image prevObstacleMat, and then divided by the quantity of pixels pxN of each contour to compute a proportion of valid pixel values avgVldpxN of each contour.

A saturation sat is obtained according to the image norm SMat and divided by the quantity of pixels pxN of each contour to compute an average saturation avgSat of each contour.

In this example, the third preset conditions include any of the following three groups:

A. A difference in average saturation between the first contour and the second contour is greater than 60, a ratio of the average hue roughness of the first contour to the average hue roughness of the second contour is less than 0.32, the average brightness roughness of the first contour is less than 0.2, the average brightness roughness of the second contour is less than 0.24, the average brightness value of the first contour is greater than 40, the average brightness value of the second contour is less than 245, the proportion of valid pixel values of the second contour is less than 0.8, the peak of the quantity of hue pixels is greater than 830, and the quantity of pixels contained in the second contour is more than 2500.

B. A difference in average saturation between the first contour and the second contour is greater than 90, the absolute value of the difference in average brightness value between the first contour and the second contour is less than 30, the average brightness roughness of the second contour is less than 0.27, the proportion of valid pixel values of the second contour is less than 0.78, and the quantity of pixels contained in the second contour is greater than 2500.

C. The average hue value of the first contour is less than 80, the average hue value of the second contour is greater than 52, the proportion of valid pixel values of the second contour is less than 0.38, the average brightness roughness of the second contour is greater than 0.265, the average hue roughness of the second contour is greater than 0.2, the quantity of over-bright pixels is greater than 190, the average brightness value of the second contour is greater than 110, and the quantity of pixels contained in the second contour is greater than 3000.

Figure 8:
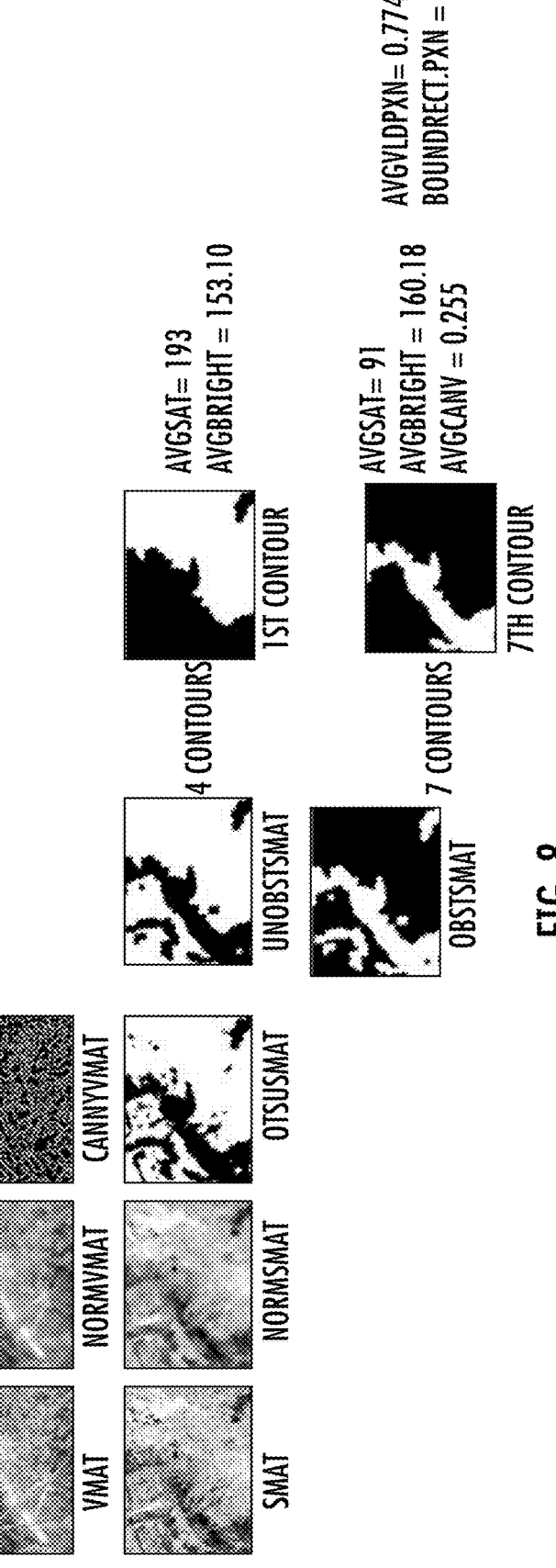
FIG. 8 is a schematic diagram of each image obtained in another specific example of the present application.

With reference to FIG. 8, the analysis results show 4 first contours and 7 second contours.

Regarding the $1^{st}$ first contour:

The average saturation avgSat=193, and the average brightness value avgBright=153.10.

Regarding the $7^{th}$ second contour:

The average saturation avgSat=91, the average brightness value avgBright=160.18, the average brightness roughness avgCanV=0.255, the proportion of valid pixel values avgVldpxN=0.774, and the quantity of pixels contained in the contour boundRect. pxN=4030.

After analysis, it may be determined that the image features of the $1^{st}$ first contour and the $7^{th}$ second contour and the differences between the two satisfy the foregoing condition B, and there are non-lawn regions in the currently obtained original image.

It should be understood that, although the steps are displayed sequentially according to the instructions of arrows in the flowcharts of the embodiments described above, these steps are not necessarily performed sequentially according to the sequence instructed by the arrows. Unless otherwise explicitly specified in this application, execution of the steps is not strictly limited, and the steps may be performed in other sequences. Moreover, at least some of the steps in the flowchart of each embodiment may include a plurality of steps or a plurality of stages. The steps or stages are not necessarily performed at the same time, but may be performed at different times. Execution of the steps or stages is not necessarily sequentially performed, but may be performed alternately with other steps or at least some of steps or stages of other steps.

Based on the same concept, another embodiment of the present application further provides an image analysis apparatus for implementing the foregoing image analysis method. An implementation solution provided by the image analysis apparatus to solve problems is similar to that described in the foregoing method. Therefore, specific definitions in one or more embodiments of the image analysis apparatus provided below may be referred to the definitions on the foregoing image analysis method, and will not be repeated here.

Figure 9:
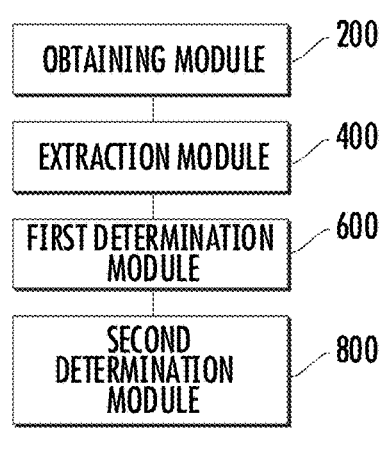
FIG. 9 is a schematic structural diagram of an image analysis apparatus provided in an embodiment of the present application.

With reference to FIG. 9, the image analysis apparatus provided in this embodiment includes an obtaining module 200, an extraction module 400, a first determination module 600, and a second determination module 800.

The obtaining module 200 is configured to obtain a saturation channel image according to an original image;

The extraction module 400 is configured to extract several contours from the saturation channel image;

The first determination module 600 is configured to determine target parameter values corresponding to each contour;

The second determination module 800 is configured to determine, according to analysis results of the target parameter values corresponding to each contour, whether there is a non-working region in the original image.

According to the image analysis apparatus provided in this embodiment, a saturation channel image is first obtained according to an original image, then several contours are extracted from the saturation channel image, target parameter values corresponding to each contour is determined, the target parameter values corresponding to each contour is finally analyzed, and whether there is a non-working region in the original image is determined according to analysis results. That is, the saturation channel image may be pre-segmented by using saturation difference characteristics of different types of ground regions, further parameter analysis may be performed on the segmented contours in combination with the characteristics or differences between a working region and a non-working region, and then whether there is a non-working region in each contour may be recognized one by one, thereby effectively reducing omission of non-working regions in the image, recognizing the non-working regions in the image more accurately, and improving the efficiency and safety of an intelligent device.

In one embodiment, the target parameter values include any of contour width, contour height, quantity of pixels contained in a contour, proportion of valid pixel values, average saturation, average brightness roughness, average brightness value, average hue value, quantity of over-bright pixels, peak of the quantity of hue pixels, quantity of non-exposed white pixels, and average hue roughness.

In one embodiment, the first determination module 600 is configured to:

convert the original image into an HSV image;

perform color segmentation on the HSV image in combination with a hue channel threshold, a saturation channel threshold, and a value channel threshold to obtain a target image;

obtain a quantity of green pixels in the target image; and determine a proportion of valid pixel values in combination with the quantity of green pixels in the target image and a quantity of pixels contained in the contour.

In one embodiment, the obtaining module 200 may be further configured to obtain a value channel image according to the original image; and the first determination module 600 is configured to:

determine the quantity of over-bright pixels according to the value channel image;

pre-process the value channel image, where the pre-processing includes filtering and normalization;

determine a brightness value according to the pre-processed image, and determine the average brightness value based on the brightness value and the quantity of pixels contained in the contour;

perform edge extraction on the pre-processed image to obtain an edge image; and determine a brightness roughness according to the edge image, and determine an average brightness roughness based on the brightness roughness and the quantity of pixels contained in the contour.

In one embodiment, the obtaining module 200 may be further configured to obtain a hue channel image according to the original image; and the first determination module 600 is configured to:

determine a hue value according to the hue channel image, and determine the average hue value based on the hue value and the quantity of pixels contained in the contour;

obtain a histogram corresponding to the hue channel image, and determine a peak of the quantity of hue pixels according to the histogram;

pre-process the hue channel image, perform edge extraction on the pre-processed image to obtain an edge image, determine a hue roughness according to the edge image, and determine an average hue roughness based on the hue roughness and the quantity of pixels contained in the contour; and determine the quantity of non-exposed white pixels by combining the value channel image and the hue channel image.

In one embodiment, the extraction module 400 is configured to:

perform threshold segmentation on the saturation channel image;

perform an open operation and a close operation on an image obtained after the threshold segmentation to obtain a first image;

perform an inverse operation on the first image to obtain a second image; and extract several first contours from the first image and several second contours from the second image, respectively.

In one embodiment, the second determination module 800 is configured to determine that there is the non-working region in the original image if the target parameter values corresponding to any first contour satisfy first preset conditions, or if the target parameter values corresponding to any second contour satisfy second preset conditions.

In one embodiment, the first preset conditions include: the proportion of valid pixel values is less than a first preset proportion, the average brightness roughness is less than a first brightness roughness, the average brightness value is greater than a first preset brightness value, the quantity of pixels contained in the contour is within a preset range, the peak of the quantity of hue pixels is greater than a first peak value, and the average hue value is greater than a first preset hue value;

The second preset conditions include: the quantity of over-bright pixels is greater than a first quantity of pixels, the quantity of non-exposed white pixels is greater than a second quantity of pixels, the proportion of valid pixel values is less than a second preset proportion, the average brightness roughness is less than a second brightness roughness, and the average brightness value is less than a second preset brightness value.

In one embodiment, the second determination module 800 is configured to determine that there is a non-working region in the original image if differences between the target parameter values corresponding to any first contour and the target parameter values corresponding to any second contour satisfy third preset conditions.

In one embodiment, the third preset conditions include:

a difference in average saturation between the first contour and the second contour is greater than a first difference, a ratio of the average hue roughness of the first contour to the average hue roughness of the second contour is less than a preset ratio, the average brightness roughness of the first contour is less than a third brightness roughness, the average brightness roughness of the second contour is less than a fourth brightness roughness, the average brightness value of the first contour is greater than a third preset brightness value, the average brightness value of the second contour is less than a fourth preset brightness value, the proportion of valid pixel values of the second contour is less than a third preset proportion, the peak of the quantity of hue pixels is greater than a second peak value, and the quantity of pixels contained in the second contour is greater than a third quantity of pixels;

Or, the third preset conditions include:

a difference in average saturation between the first contour and the second contour is greater than a second difference, an absolute value of the difference in average brightness value between the first contour and the second contour is less than a third difference, the average brightness roughness of the second contour is less than a fifth brightness roughness, the proportion of valid pixel values of the second contour is less than a fourth preset proportion, and the quantity of pixels contained in the second contour is greater than a fourth quantity of pixels;

Or, the third preset conditions include:

the average hue value of the first contour is less than a second preset hue value, the average hue value of the second contour is greater than a third preset hue value, the proportion of valid pixel values of the second contour is less than a fifth preset proportion, the average brightness roughness of the second contour is greater than a sixth brightness roughness, the average hue roughness of the second contour is greater than a preset hue roughness, the quantity of over-bright pixels is greater than a fifth quantity of pixels, the average brightness value of the second contour is greater than a fifth preset brightness value, and the quantity of pixels contained in the second contour is greater than a sixth quantity of pixels.

Each module in the foregoing image analysis apparatus may be implemented entirely or partially through software, hardware, or a combination thereof. The foregoing modules may be embedded in or independent of a processor in a computer device in a form of hardware, or stored in a memory of a computer device in a form of software, whereby the processor calls the modules to perform operations corresponding to the modules.

In one embodiment, a computer device is further provided, including a memory and a processor, the memory storing a computer program, and the steps in each of the foregoing method embodiments being implemented when the processor performs the computer program.

Figure 10:
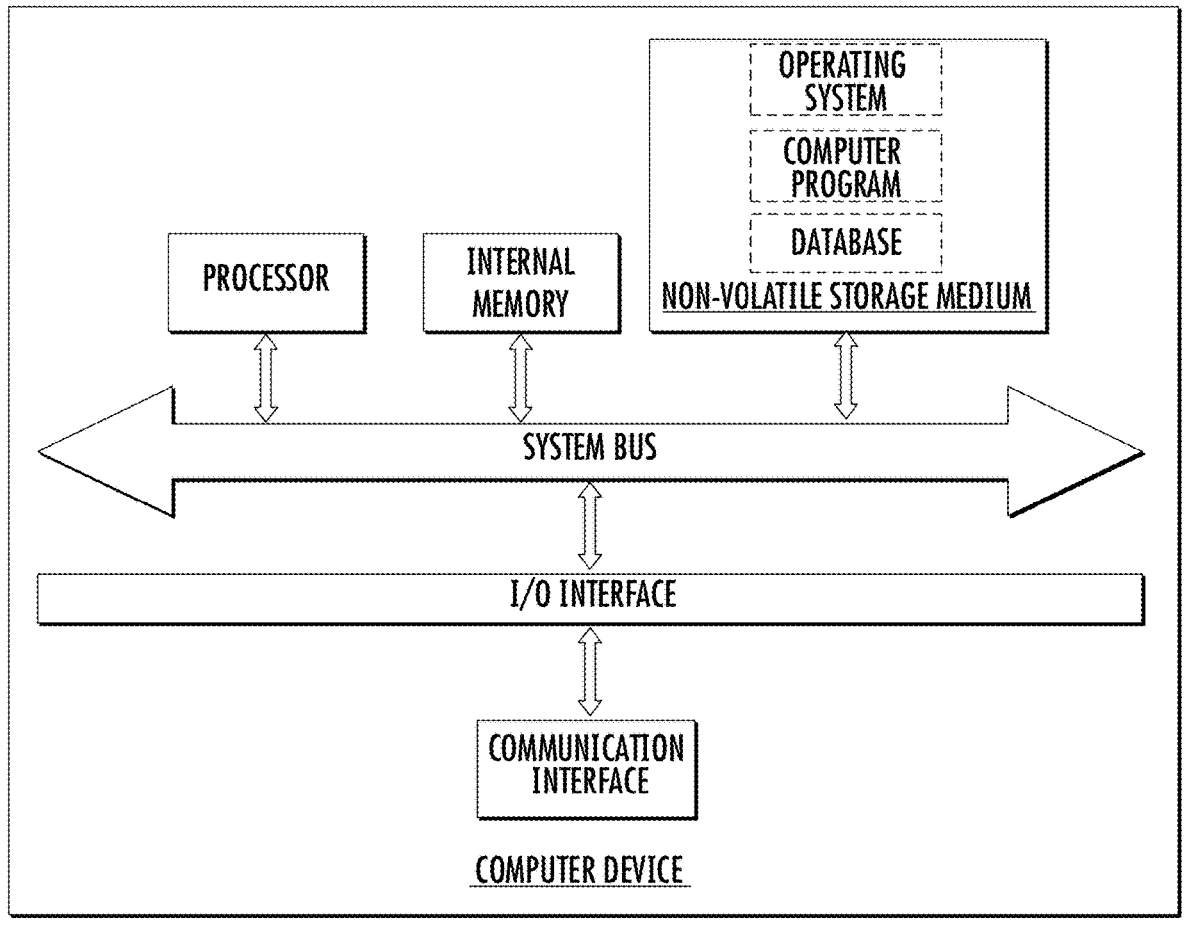
FIG. 10 is a schematic structural diagram of a computer device provided in an embodiment of the present application.

FIG. 10 is a schematic structural diagram of a computer device provided in an embodiment of the present application. The computer device may be a server, and its internal structure may be shown in FIG. 10. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store various data involved in the image analysis method. The network interface of the computer device is configured to communicate with an external terminal through a network connection. The computer program is executed by the processor to implement an image analysis method.

Those skilled in the art may understand that the structure shown in FIG. 10 is only a block diagram of a partial structure related to the solution of the present application, and does not constitute a limitation on the computer device to which the solution of the present application is applied. The specific computer device may include more or fewer parts than shown in the figure, or combine some parts, or have a different arrangement of parts.

In one embodiment, a computer-readable storage medium storing a computer program is provided, the steps in each of the foregoing method embodiments being implemented when the computer program is performed by a processor.

A person of ordinary skill in the art may understand that all or part of the processes in the methods of the foregoing embodiments may be implemented by a computer program instructing relevant hardware. The computer program may be stored in a non-volatile computer-readable storage medium. The computer program, when executed, may include the processes of the embodiments of the above methods. Any reference to the memory, storage, database or other media used in the embodiments provided by the present application may include at least one of non-volatile and volatile memories. The non-volatile memory may include a Read-Only Memory (ROM), a magnetic tape, a floppy disk, a flash memory, or an optical memory. The volatile memory may include a Random Access Memory (RAM) or an external cache memory. As an illustration and not a limitation, the RAM may be in many forms, such as a static random-access memory (SRAM) or a dynamic random-access memory (DRAM).

The technical features of the above embodiments may be combined arbitrarily. For the purpose of simplicity in description, all possible combinations of the technical features in the above embodiments are not described. However, as long as the combinations of these technical features do not have contradictions, they shall fall within the scope of this specification.

The foregoing embodiments only describe several implementations of the present application, and their descriptions are specific and detailed, but cannot therefore be understood as limitations to the patent scope. It should be noted that, for a person of ordinary skill in the art, many transformations and improvements may be made without departing from the idea of this application. These transformations and improvements fall within the protection scope of this application. Therefore, the protection scope of the present application should be subject to the appended claims.

The invention claimed is:

1. An image analysis method, comprising the steps of:
obtaining a saturation channel image according to an original image;
extracting several contours from the saturation channel image;
determining target parameter values corresponding to each contour; and
determining according to analysis results of the target parameter values corresponding to each contour whether a non-working region exists in the original image,
wherein the target parameter values comprise any of a contour width, a contour height, a quantity of pixels contained in a contour, a proportion of valid pixel values, an average saturation, an average brightness roughness, an average brightness value, an average hue value, a quantity of over-bright pixels, a peak quantity of hue pixels, a quantity of non-exposed white pixels, and an average hue roughness, and
wherein the step of determining target parameter values corresponding to each contour comprises the steps of:
converting the original image into an HSV image;
performing color segmentation on the HSV image in combination with a hue channel threshold, a saturation channel threshold, and a value channel threshold to obtain a target image;
obtaining a quantity of green pixels in the target image; and
determining the proportion of valid pixel values in combination with the quantity of green pixels in the target image and the quantity of pixels contained in the contour.

2. The image analysis method according to claim 1, further comprising:
obtaining a value channel image according to the original image;
wherein the step of determining target parameter values corresponding to each contour comprises the steps of:

determining the quantity of over-bright pixels according to the value channel image;
pre-processing the value channel image to obtain a pre-processed image, wherein the pre-processing comprises filtering and normalization;
determining a brightness value according to the pre-processed image, and determining the average brightness value based on the brightness value and the quantity of pixels contained in the contour;
performing edge extraction on the pre-processed image to obtain an edge image; and
determining the brightness roughness according to the edge image, and determining the average brightness roughness based on the brightness roughness and the quantity of pixels contained in the contour; and/or
the image analysis method further comprises the steps of:
obtaining a hue channel image according to the original image; wherein the determining target parameter values corresponding to each contour comprises:
determining a hue value according to the hue channel image, and determining the average hue value based on the hue value and the quantity of pixels contained in the contour;
obtaining a histogram corresponding to the hue channel image, and determining the peak of the quantity of hue pixels according to the histogram;
pre-processing the hue channel image, performing edge extraction on the pre-processed image to obtain the edge image, determining a hue roughness according to the edge image, and determining the average hue roughness based on the hue roughness and the quantity of pixels contained in the contour; and
determining the quantity of non-exposed white pixels by combining the value channel image and the hue channel image.

3. The image analysis method according to claim 1, wherein the step of extracting several contours from the saturation channel image comprises the steps of:
performing threshold segmentation on the saturation channel image;
performing an open operation and a close operation on an image obtained after the threshold segmentation to obtain a first image;
performing an inverse operation on the first image to obtain a second image; and
extracting several first contours from the first image and several second contours from the second image, respectively.

4. The image analysis method according to claim 3, wherein the step of determining according to analysis results of the target parameter values corresponding to each contour whether there is a non-working region in the original image comprises:
determining that there is the non-working region in the original image if the target parameter values corresponding to any first contour satisfy first preset conditions, or if the target parameter values corresponding to any second contour satisfy second preset conditions.

5. The image analysis method according to claim 4, wherein the first preset conditions comprise:
the proportion of valid pixel values is less than a first preset proportion, the average brightness roughness is less than a first brightness roughness, the average brightness value is greater than a first preset brightness value, the quantity of pixels contained in the contour is within a preset range, the peak quantity of hue pixels is greater than a first peak value, and the average hue value is greater than a first preset hue value; and wherein the second preset conditions comprise:

the quantity of over-bright pixels is greater than a first quantity of pixels, the quantity of non-exposed white pixels is greater than a second quantity of pixels, the proportion of valid pixel values is less than a second preset proportion, the average brightness roughness is less than a second brightness roughness, and the average brightness value is less than a second preset brightness value.

6. The image analysis method according to claim 3, wherein the step of determining according to analysis results of the target parameter values corresponding to each contour whether there is a non-working region in the original image comprises:

determining that there is a non-working region in the original image if differences between the target parameter values corresponding to any first contour and the target parameter values corresponding to any second contour satisfy third preset conditions.

7. The image analysis method according to claim 6, wherein the third preset conditions comprise:

a difference in average saturation between the first contour and the second contour is greater than a first difference, a ratio of the average hue roughness of the first contour to the average hue roughness of the second contour is less than a preset ratio, the average brightness roughness of the first contour is less than a third brightness roughness, the average brightness roughness of the second contour is less than a fourth brightness roughness, the average brightness value of the first contour is greater than a third preset brightness value, the average brightness value of the second contour is less than a fourth preset brightness value, the proportion of valid pixel values of the second contour is less than a third preset proportion, the peak quantity of hue pixels is greater than a second peak, and the quantity of pixels contained in the second contour is greater than a third quantity of pixels;

or, wherein the third preset conditions comprise:

a difference in average saturation between the first contour and the second contour is greater than a second difference, an absolute value of the difference in average brightness value between the first contour and the second contour is less than a third difference, the average brightness roughness of the second contour is less than a fifth brightness roughness, the proportion of valid pixel values of the second contour is less than a fourth preset proportion, and the quantity of pixels contained in the second contour is greater than a fourth quantity of pixels;

or, wherein the third preset conditions comprise:

the average hue value of the first contour is less than a second preset hue value, the average hue value of the second contour is greater than a third preset hue value, the proportion of valid pixel values of the second contour is less than a fifth preset proportion, the average brightness roughness of the second contour is greater than a sixth brightness roughness, the average hue roughness of the second contour is greater than a preset hue roughness, the quantity of over-bright pixels is greater than a fifth quantity of pixels, the average brightness value of the second contour is greater than a fifth preset brightness value, and the quantity of pixels contained in the second contour is greater than a sixth quantity of pixels.

8. An image analysis apparatus comprising a processor and a storage device, wherein the image analysis apparatus when operational performs the method according to the steps of claim 1.

9. A computer device comprising a memory and a processor, the memory storing a computer program, wherein the processor implements the image analysis method according to claim 1 when executing the computer program.

10. A non-transitory computer-readable storage medium storing a computer program, wherein the image analysis method according to claim 1 is implemented when the computer program is executed by a processor.

11. An image analysis method, comprising the steps of:

obtaining a saturation channel image according to an original image;

extracting several contours from the saturation channel image;

determining target parameter values corresponding to each contour; and determining according to analysis results of the target parameter values corresponding to each contour whether a non-working region exists in the original image;

wherein the target parameter values comprise any of a contour width, a contour height, a quantity of pixels contained in a contour, a proportion of valid pixel values, an average saturation, an average brightness roughness, an average brightness value, an average hue value, a quantity of over-bright pixels, a peak quantity of hue pixels, a quantity of non-exposed white pixels, and an average hue roughness;

further comprising:

obtaining a value channel image according to the original image;

wherein the step of determining target parameter values corresponding to each contour comprises the steps of:

determining the quantity of over-bright pixels according to the value channel image;

pre-processing the value channel image to obtain a pre-processed image, wherein the pre-processing comprises filtering and normalization;

determining a brightness value according to the pre-processed image, and determining the average brightness value based on the brightness value and the quantity of pixels contained in the contour;

performing edge extraction on the pre-processed image to obtain an edge image; and determining the brightness roughness according to the edge image, and determining the average brightness roughness based on the brightness roughness and the quantity of pixels contained in the contour; and/or the image analysis method further comprises the steps of:

obtaining a hue channel image according to the original image; wherein the determining target parameter values corresponding to each contour comprises:

determining a hue value according to the hue channel image, and determining the average hue value based on the hue value and the quantity of pixels contained in the contour;

obtaining a histogram corresponding to the hue channel image, and determining the peak of the quantity of hue pixels according to the histogram;

pre-processing the hue channel image, performing edge extraction on the pre-processed image to obtain the edge image, determining a hue roughness according to the edge image, and determining the average hue roughness based on the hue roughness and the quantity of pixels contained in the contour; and determining the quantity of non-exposed white pixels by combining the value channel image and the hue channel image.

12. An image analysis method, comprising the steps of:

obtaining a saturation channel image according to an original image;

extracting several contours from the saturation channel image;

determining target parameter values corresponding to each contour; and determining according to analysis results of the target parameter values corresponding to each contour whether a non-working region exists in the original image;

wherein the target parameter values comprise any of a contour width, a contour height, a quantity of pixels contained in a contour, a proportion of valid pixel values, an average saturation, an average brightness roughness, an average brightness value, an average hue value, a quantity of over-bright pixels, a peak quantity of hue pixels, a quantity of non-exposed white pixels, and an average hue roughness;

wherein the step of extracting several contours from the saturation channel image comprises the steps of:

performing threshold segmentation on the saturation channel image;

performing an open operation and a close operation on an image obtained after the threshold segmentation to obtain a first image;

performing an inverse operation on the first image to obtain a second image; and extracting several first contours from the first image and several second contours from the second image, respectively.

13. The image analysis method according to claim 12, wherein the step of determining according to analysis results of the target parameter values corresponding to each contour whether there is a non-working region in the original image comprises:

determining that there is the non-working region in the original image if the target parameter values corresponding to any first contour satisfy first preset conditions, or if the target parameter values corresponding to any second contour satisfy second preset conditions.

14. The image analysis method according to claim 13, wherein the first preset conditions comprise:

the proportion of valid pixel values is less than a first preset proportion, the average brightness roughness is less than a first brightness roughness, the average brightness value is greater than a first preset brightness value, the quantity of pixels contained in the contour is within a preset range, the peak quantity of hue pixels is greater than a first peak value, and the average hue value is greater than a first preset hue value; and wherein the second preset conditions comprise:

the quantity of over-bright pixels is greater than a first quantity of pixels, the quantity of non-exposed white pixels is greater than a second quantity of pixels, the proportion of valid pixel values is less than a second preset proportion, the average brightness roughness is less than a second brightness roughness, and the average brightness value is less than a second preset brightness value.

15. The image analysis method according to claim 12, wherein the step of determining according to analysis results of the target parameter values corresponding to each contour whether there is a non-working region in the original image comprises:

determining that there is a non-working region in the original image if differences between the target parameter values corresponding to any first contour and the target parameter values corresponding to any second contour satisfy third preset conditions.

16. The image analysis method according to claim 15, wherein the third preset conditions comprise:

a difference in average saturation between the first contour and the second contour is greater than a first difference, a ratio of the average hue roughness of the first contour to the average hue roughness of the second contour is less than a preset ratio, the average brightness roughness of the first contour is less than a third brightness roughness, the average brightness roughness of the second contour is less than a fourth brightness roughness, the average brightness value of the first contour is greater than a third preset brightness value, the average brightness value of the second contour is less than a fourth preset brightness value, the proportion of valid pixel values of the second contour is less than a third preset proportion, the peak quantity of hue pixels is greater than a second peak, and the quantity of pixels contained in the second contour is greater than a third quantity of pixels;

or, wherein the third preset conditions comprise:

a difference in average saturation between the first contour and the second contour is greater than a second difference, an absolute value of the difference in average brightness value between the first contour and the second contour is less than a third difference, the average brightness roughness of the second contour is less than a fifth brightness roughness, the proportion of valid pixel values of the second contour is less than a fourth preset proportion, and the quantity of pixels contained in the second contour is greater than a fourth quantity of pixels;

or, wherein the third preset conditions comprise:

the average hue value of the first contour is less than a second preset hue value, the average hue value of the second contour is greater than a third preset hue value, the proportion of valid pixel values of the second contour is less than a fifth preset proportion, the average brightness roughness of the second contour is greater than a sixth brightness roughness, the average hue roughness of the second contour is greater than a preset hue roughness, the quantity of over-bright pixels is greater than a fifth quantity of pixels, the average brightness value of the second contour is greater than a fifth preset brightness value, and the quantity of pixels contained in the second contour is greater than a sixth quantity of pixels.

\* \* \* \* \*